United States Patent
Mathy, Jr. et al.

(10) Patent No.: US 8,573,963 B2
(45) Date of Patent: Nov. 5, 2013

(54) ADJUSTABLE MULTIPLE-PIECE CAM TRACK

(75) Inventors: John M. Mathy, Jr., Stewartstown, PA (US); Paul W. Klinedinst, Sr., Windsor, PA (US)

(73) Assignee: Graham Engineering Corporation, York, PA (US)

( * ) Notice: Subject to any disclaimer, the term of this patent is extended or adjusted under 35 U.S.C. 154(b) by 354 days.

(21) Appl. No.: 13/078,115

(22) Filed: Apr. 1, 2011

(65) Prior Publication Data

US 2012/0251653 A1     Oct. 4, 2012

(51) Int. Cl.
  *F16H 53/04*     (2006.01)
(52) U.S. Cl.
  USPC ..... 425/451.4; 425/193; 425/541; 465/297.3; 465/209.2
(58) Field of Classification Search
  USPC ............ 425/540, 541, 193, 192, 182, DIG. 5, 425/451.4; 264/297.2, 297.3, 209.2
  See application file for complete search history.

(56) References Cited

U.S. PATENT DOCUMENTS

| | | | |
|---|---|---|---|
| 1,260,637 A | 3/1918 | Canfield | |
| 2,189,290 A | 2/1940 | Moorhead | |
| 2,313,477 A | 3/1943 | Neff | |
| 3,459,066 A | 8/1969 | Holmes | |
| 3,543,339 A | 12/1970 | Stefaniak | |
| 3,608,015 A | 9/1971 | Martelli | |
| 3,764,250 A | 10/1973 | Waterloo | |
| 4,141,680 A * | 2/1979 | Kauffman et al. | 425/529 |
| 4,698,012 A | 10/1987 | Shelby et al. | |
| 5,051,227 A | 9/1991 | Brun, Jr. et al. | |
| 5,225,216 A * | 7/1993 | Barracchini et al. | 425/451.5 |
| 5,531,588 A | 7/1996 | Brun, Jr. et al. | |
| 5,705,121 A | 1/1998 | Allred, Jr. | |
| 5,948,346 A | 9/1999 | Mills et al. | |
| 7,638,082 B2 | 12/2009 | Mattice et al. | |

FOREIGN PATENT DOCUMENTS

DE   102008010885 A1   8/2009
EP   1211042 A1   6/2002

OTHER PUBLICATIONS

PCT International Search Report, 14 pgs, Sep. 2012.

* cited by examiner

*Primary Examiner* — Joseph S Del Sole
*Assistant Examiner* — Nahida Sultana
(74) *Attorney, Agent, or Firm* — McNees Wallace & Nurick LLC

(57) ABSTRACT

A multiple-piece cam unit for use in a molding machine. The cam unit has a cam track which engages cam followers of mold assemblies of the molding machine to move the cam followers between a first position and a second position. The cam unit includes a first cam section and a second cam section. The first cam section has an entrance portion which is dimensioned to receive the cam followers therein. The second cam section has an exit portion positioned to release the cam followers therefrom. The second cam section is moveably mounted to the molding machine to allow the exit portion of the second cam section to be moved relative to the entrance portion of the first cam section, to insure that the cam followers exiting the exit portion of the second cam section are properly aligned to enter the entrance portion of the first cam section.

19 Claims, 7 Drawing Sheets

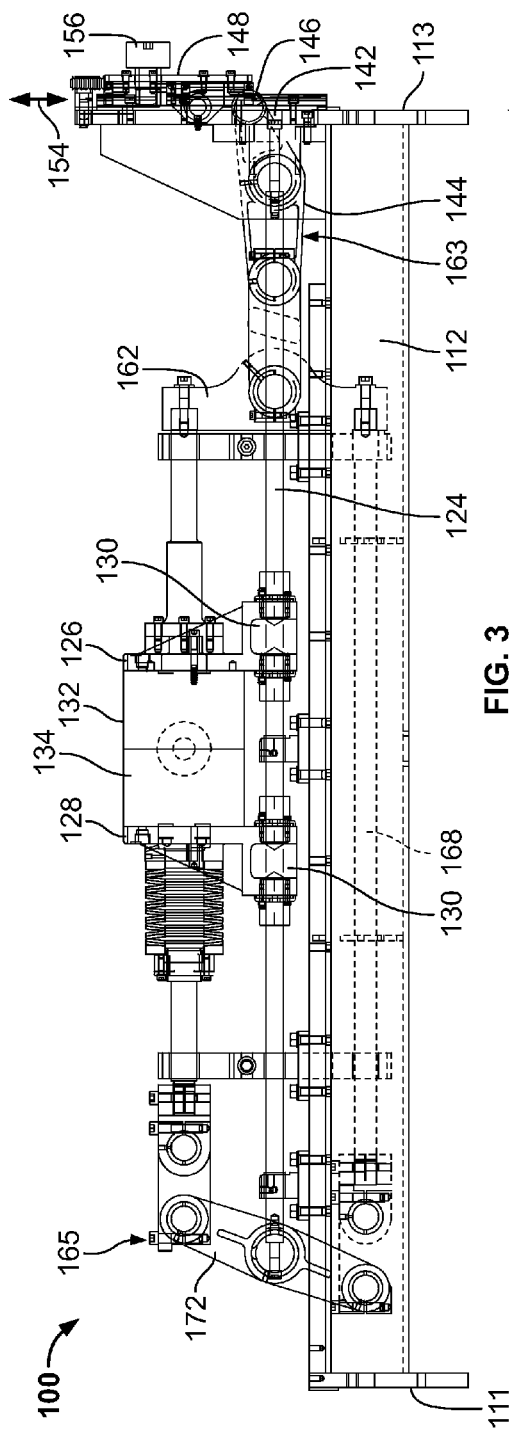
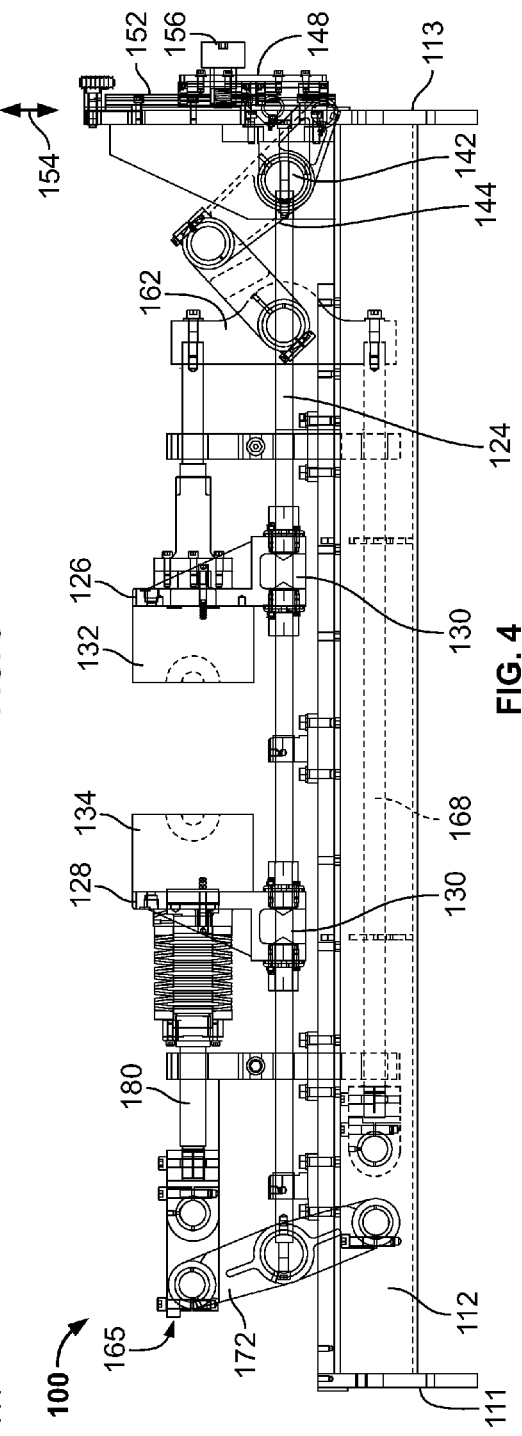
FIG. 3
FIG. 4

ADJUSTABLE MULTIPLE-PIECE CAM TRACK

FIELD OF THE INVENTION

The invention relates generally to a rotary molding apparatus. Specifically, the present invention relates to an adjustable cam track for use with the rotary molding apparatus.

BACKGROUND OF THE INVENTION

Conventional rotary extrusion blow molding apparatuses typically have a structural frame mounted on a rotating shaft. The structural frame has a plurality of molds mounted thereon and is known in the industry as a wheel. As the wheel is rotated, the plurality of molds is rotated past an extrusion die extruding a continuous parison. Each mold typically includes two mold halves, each comprising a mold cavity half therein, such that when the mold halves are closed, the mold defines a mold cavity corresponding to the configuration of the article to be molded, such as a container. Each mold, seriatim, is rotated past the extrusion die with the mold halves in an open configuration. The mold halves of each mold are then closed around the parison to enclose the parison within the mold defined by the mold halves. A blowing needle is then inserted into the parison within the closed mold and internal pressure is introduced to the parison, forcing it to inflate and conform to the configuration of the mold cavity. The molded object is then cooled and the mold opened to release the molded object from the mold.

As the wheel is rotated, cam followers positioned on each mold engage a cam track. The cam followers follow the cam track, causing the cam followers to move laterally relative to the rotational movement of the wheel. The lateral movement of the cam followers controls the position of the mold halves and their movement between the open and closed positions.

When the two mold halves are clamped over one or more parisons prior to blowing of the parisons to form plastic containers, high clamp forces are required to close the mold halves on the parisons to pinch off the plastic and to hold the mold halves closed during blow molding. As some of the high clamp forces are transmitted through the cam followers, the cam track must be made of substantial material to withstand the forces applied to the walls thereof. This is particularly important in transition areas of the cam track. The continuous motion of the rotary molding apparatuses intensifies the wear issues, and therefore, the cam track must be made to withstand the high wear forces associated therewith. Additionally, in order to provide the precise control needed to provide quality molded products, the positioning, dimensioning and configuration of the cam track must be precisely controlled in order to provide the precision necessary for the opening and closing of the mold halves.

Due to the above-recited requirements, the cam tracks are generally made in one piece to provide the strength and dimensions required. However, due to the relatively large size of the cam tracks (generally 50-60 inch radius), these cam tracks are difficult and costly to manufacture and ship. In addition, when adjustments or maintenance is required on the cam tracks, the blow molding apparatus must generally be taken out of operation for a significant period of time while the adjustments or maintenance are performed.

Accordingly, there is a need for an improved molding apparatus and cam track which is easy and cost-effective to manufacture and which allows for ease and efficiency of adjustment and maintenance.

SUMMARY OF THE INVENTION

An exemplary embodiment is directed to a multiple-piece cam unit for use in a molding machine. The cam unit has a cam track which engages cam followers of mold assemblies of the molding machine to move the cam followers between a first position and a second position. The cam unit includes a first cam section and a second cam section. The first cam section has an entrance portion which is dimensioned to receive the cam followers therein. The second cam section has an exit portion positioned to release the cam followers therefrom. The second cam section is movably mounted to the molding machine to allow the exit portion of the second cam section to be moved relative to the entrance portion of the first cam section. The exit portion can be adjusted to insure that the cam followers exiting the exit portion of the second cam section are properly aligned to enter the entrance portion of the first cam section.

An alternate exemplary embodiment is directed to a multiple-piece cam unit for use in a molding machine. The cam unit has a cam track which engages cam followers of mold assemblies of the molding machine. The cam unit has a first cam section and a second cam section. The first cam section has an entrance portion and a declining portion. The entrance portion is dimensioned to receive the cam followers therein. The declining portion cooperates with the cam followers to move the cam followers from a first position, in which mold halves of the mold assemblies are maintained in a closed position, to a second position, in which the mold halves of the mold assemblies are maintained in an open position. The second cam section has an exit portion and an actuation portion. The exit portion is positioned to release the cam followers therefrom. The actuation portion cooperates with the cam followers to move the cam followers from the second position to the first position. The second cam section is pivotally mounted to the molding machine to allow the exit portion of the second cam section to be moved relative to the entrance portion of the first cam section. The exit portion can be adjusted to insure that the cam followers exiting the exit portion of the second cam section are properly aligned to enter the entrance portion of the first cam section.

An alternate exemplary embodiment is directed to a rotary molding machine. A pair of turntables are rotatably mounted on a shaft of the molding machine. A plurality of mold clamp assemblies are mounted on and spaced around the turntable, the mold clamp assemblies having cam followers which are mechanically connected to mold halves of the mold clamp assemblies. The cam followers are moveable between a first position, in which the mold halves of the mold assemblies are maintained in a closed position, and a second position, in which the mold halves of the mold assemblies are maintained in an open position. A multiple-piece cam unit is mounted to the molding machine. The cam unit has a cam track which engages the cam followers. The cam unit also has a first cam section and a second cam section. The first cam section has an entrance portion dimensioned to receive the cam followers therein. The second cam section has an exit portion positioned to release the cam followers therefrom. The second cam section is pivotally mounted to the molding machine to allow the exit portion of the second cam section to be moved relative to the entrance portion of the first cam section. The exit portion of the second cam section can be adjusted to insure that the cam followers exiting the exit portion of the second cam section are properly aligned to enter the entrance portion of the first cam section as the turntables are rotated.

Other features and advantages of the present invention will be apparent from the following more detailed description of

BRIEF DESCRIPTION OF THE DRAWINGS

FIG. 3 is a side view of an exemplary embodiment of a modular mold clamp assembly for use in the blow molding machine, the modular mold clamp assembly having molds inserted therein and being shown in the closed position.

FIG. 4 is a side view of the modular mold clamp assembly, the modular mold clamp assembly having molds inserted therein and being shown in the open position.

DETAILED DESCRIPTION OF THE INVENTION

The exemplary adjustable multiple-piece cam track described herein can be used with various rotary type machines, including, but not limited to, the exemplary rotary blow molding machine shown and described in co-pending U.S. patent application Ser. No. 12/898,832, filed on Oct. 6, 2010, which is hereby incorporated, in its entirety, by reference.

The exemplary rotary blow molding machine is adapted to engage a tubular parison and transform the same into hollow, molded objects, such as containers of various types. As is known in the industry, the parison comprises resin which is homogeneously melted within an extruder of suitable type.

Figure 1:
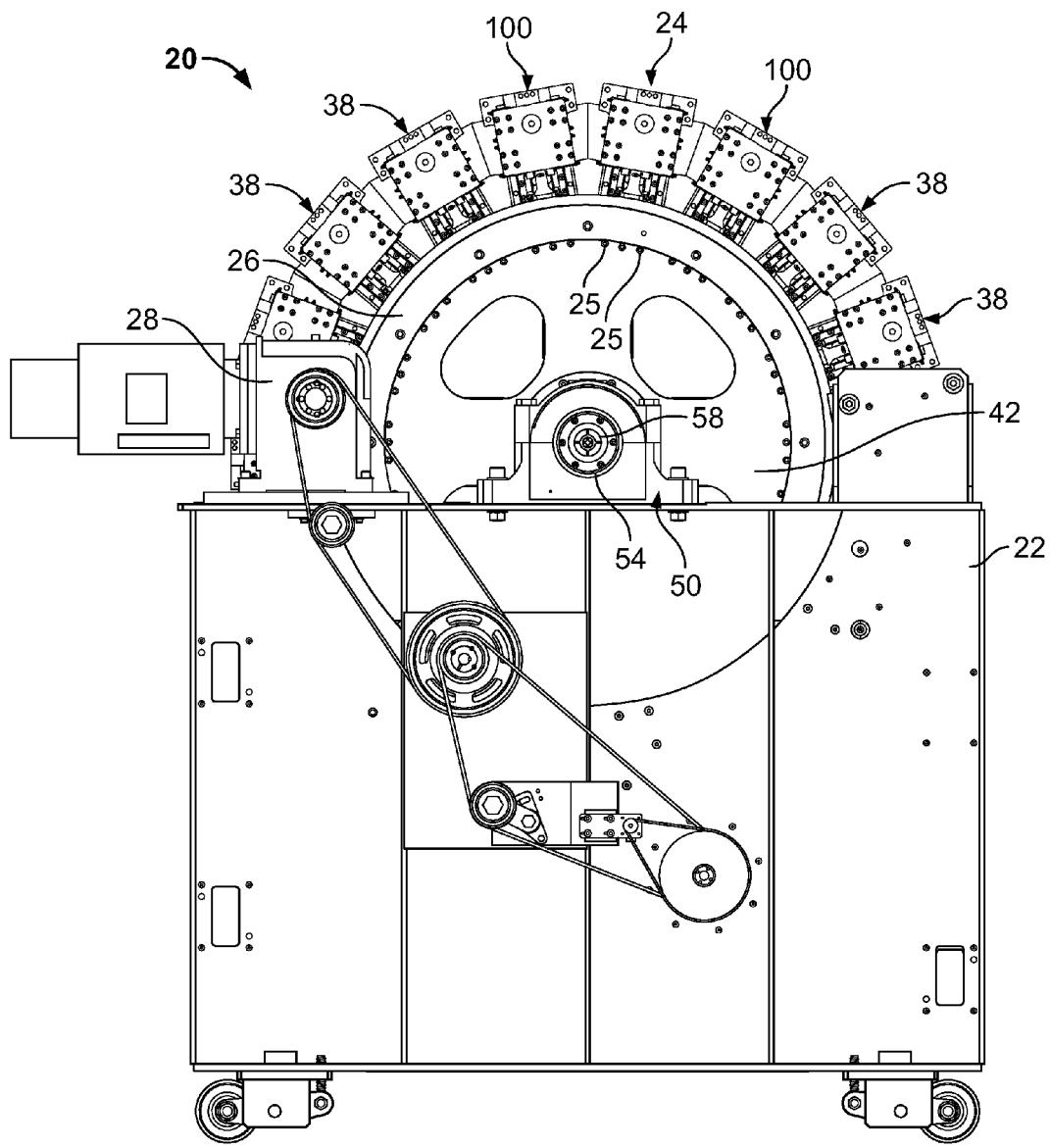
FIG. 1 is a side elevation of an exemplary blow molding machine embodying the principles of the present invention.
Figure 2:
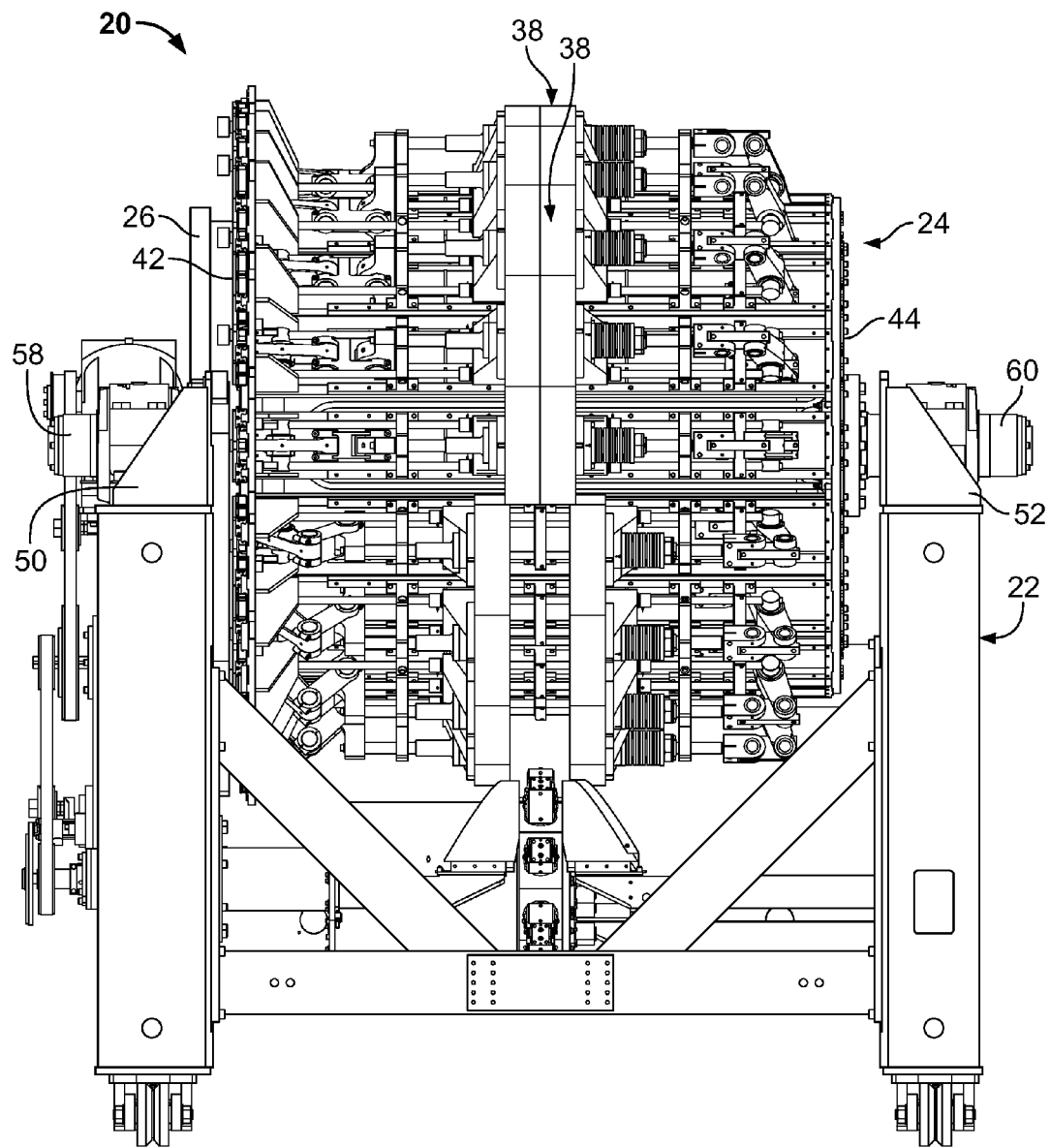
FIG. 2 is a front elevation of the blow molding machine shown in FIG. 1.

Referring now to FIG. 1 and FIG. 2, the exemplary plastic blow molding machine 20 includes a base 22 and a movable member or wheel 24 mounted on the base for rotation thereon about a rotational axis A. The movable member 24 may be in the form of a wheel or other such configurations which are rotatable about the rotational axis. As illustrated, the blow molding machine includes a ring gear or drive gear 26 driven by a drive mechanism 28. The ring gear 26 is mounted to turntable 42 and rotates the wheel 24.

As best shown in FIG. 1, the plastic blow molding machine 20 includes a plurality of blow molding stations 38 mounted on the wheel 24 for rotation therewith about the rotational axis A. As shown in the exemplary embodiment, the wheel 24 has eighteen mold stations 38, provided between components or turntables 42, 44 of the wheel 24, although other configurations may be used. The components 42, 44 may be in the form of turntables or other such configurations which are rotatable about the rotational axis.

The turntables 42, 44 of wheel 24 are mounted for rotation within a substantially vertical plane transverse to the axis of the base 22. For this purpose, base 22 supports, in transversely-spaced relationship, a pair of vertical standards 50, 52, which are heavy castings or the like, firmly secured, at the lower ends thereof, directly to base 22 by appropriate means. The upper ends of the standards 50, 52 respectively support bearings 54, 56 (FIG. 14), from which the main supporting stub shafts 58, 60 extend.

The turntables 42, 44 of wheel 24 are fixed to and carried by respective shafts 58, 60. Each of the turntables 42, 44 is prevented from inward axial movement and disengagement from respective stub shafts 58, 60 by any known suitable means, such as a lock ring. Extending between turntables 42, 44, at each mold station 38 and in even, circumferentially-spaced relationship to each other, are the mold clamp assemblies 100, which are firmly secured at the ends thereof, respectively, to the turntables 42, 44.

The circumferentially-spaced arrangement of the various mold clamp assemblies 100 is best illustrated in FIG. 1. In order that the illustration in FIG. 2 might be simplified for clarity of concept, only several of the mold clamp assemblies 100 are illustrated therein, whereas the intervening mold clamp assemblies 100 have been omitted. It is to be understood, however, that the machine shown in FIG. 2 embodies a full complement of the mold clamp assemblies 100 at each molding station 38, such as shown in FIG. 1.

Firmly and removably secured to the outer face of the turntable 42 is the ring gear 26 of extensive diameter, as can readily be seen from FIGS. 1 and 2. The ring gear 26 and drive mechanism 28 generally operate at a predetermined speed which is capable of adjustment by conventional means.

Figure 5:
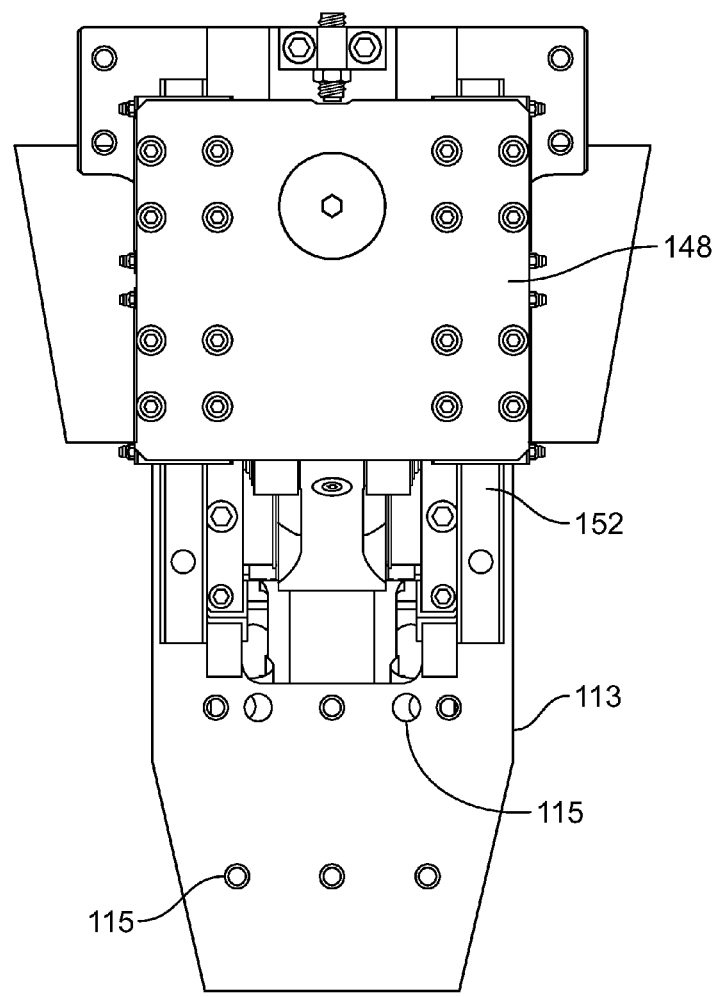
FIG. 5 is an end view of the modular mold clamp assembly of FIG. 3, as viewed from outside of the assembly.

Referring to FIGS. 3-5, an exemplary embodiment of mold clamp assembly 100 is shown, the modular mold clamp assembly 100 having a frame 110. The frame 110 has a base member 112 and two oppositely-facing end members 111, 113. The end members 111, 113 extend from either end of the base member 112 in a direction that is essentially transverse to the longitudinal axis of the base member 112. The end members 111, 113 are integrally attached to the base member in any known manner which has the strength characteristics required. Mounting openings 115 are provided on the frame 110 proximate the ends of the base member 112. The openings 115 cooperate with mounting hardware (not shown) to mount the modular mold clamp assembly 100 to mounting openings 25 of the turntables 42, 44 of the wheel 24. The base member 112 and end members 111, 113 are made from any material that has the strength characteristics required to support the components of the modular mold clamp assembly 100 and to provide the structural integrity required to support the radially extending turntables 42, 44 of the wheel 24.

Each modular mold clamp assembly 100 includes mold platens 126 and 128 which are mounted on the rods 124 by slides 130 which permit movement of the platens toward and away from each other during closing and opening of mold halves 132 and 134 mounted on platens 126 and 128, respectively. FIG. 3 illustrates the assembly 100 with the mold halves closed, while FIG. 4 illustrates the assembly 100 with the mold halves open.

Pin 142 extends through a portion of end member 113. The adjacent ends of rods 124 are secured to the pin. Pivot arm 144 is rotatably mounted on pin 142 between the rods 124. The outer end 146 of arm 144 away from the mold halves extends through an opening in end member 113 and is connected to follower slide 148. The follower slide 148 is mounted on the outside surface of the end wall 113 by slide 152 to permit movement of the car back and forth in the direction of arrow

154, shown in FIGS. 3 and 4. The follower slide 148 carries cam follower roller or cam follower 156, which extends into circumferential cam track or slot 202 of the blow molding machine. Rotation of wheel 24 moves follower 156 into and around the cam track or cam slot 202 of cam unit 200 to move follower slide 148 inwardly and outwardly and rotate arm 144 between the positions shown in FIGS. 3 and 4.

With the mold halves 132 and 134 in the open position and drive 163 retracted as shown in FIG. 4, rotation of wheel 24 moves the open mold halves 132, 134 past the extrusion station to either side of a number of parisons extruded from an extrusion head. Rotation of the wheel 24 also moves follower 156 along a radially outward portion of a cam slot 202 (FIG. 6) to move follower slide 148 radially outwardly from the position of FIG. 4 to the position of FIG. 3. This movement rotates arm 144 counterclockwise from the position of FIG. 4 to the position of FIG. 3. Movement of the actuating means to affect such opening and closing movements of the mold die is achieved by mold-actuating cam means now to be described.

Figure 6:
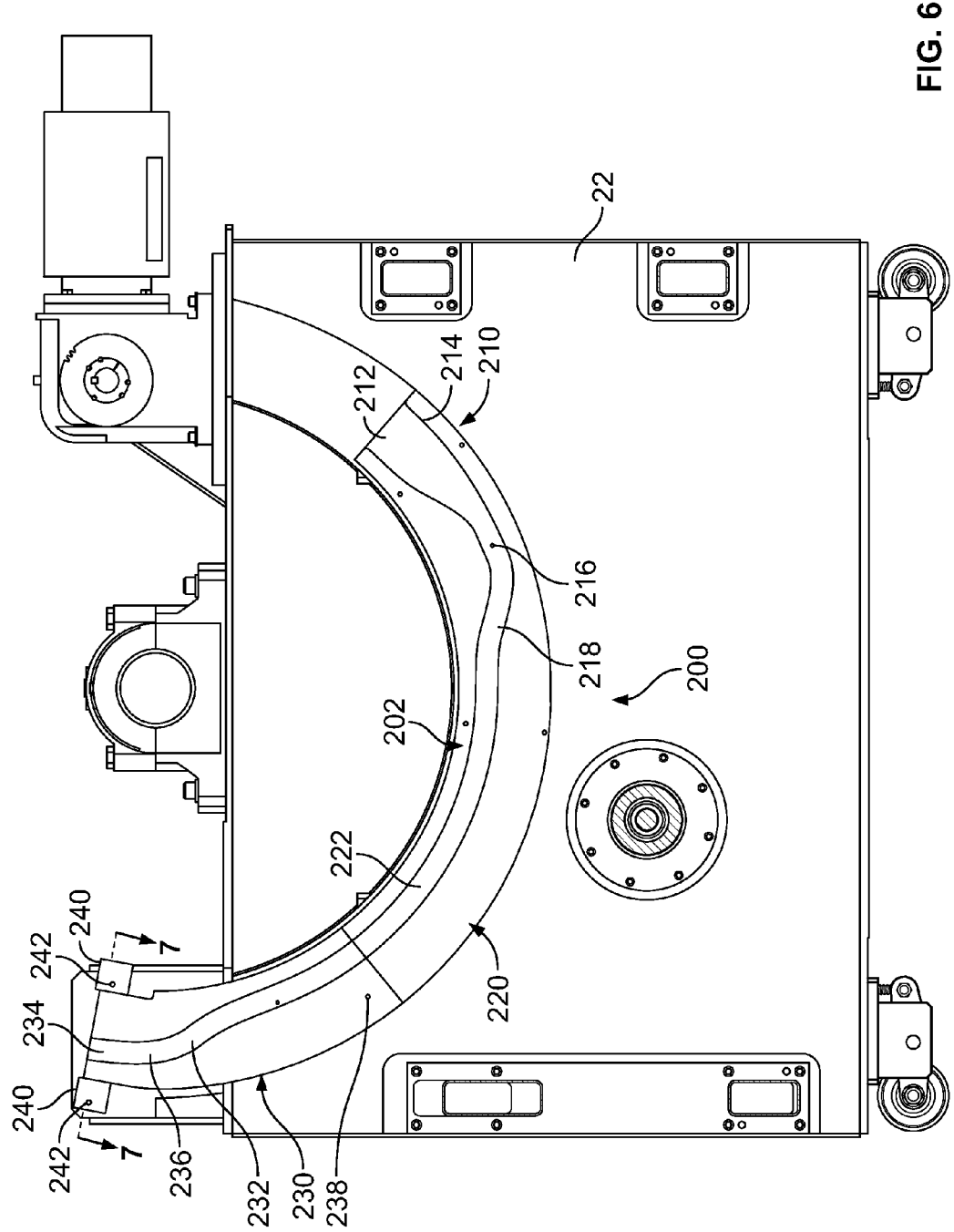
FIG. 6 is a vertical elevation of a cam unit carried by the base of the blow molding machine, the cam unit being shown in a first position.

Referring to FIG. 6, an exemplary cam unit or assembly 200 with cam slot 202 is illustrated. The cam unit 200 is positioned proximate a respective turntable 42 and is secured to the base 22. The cam unit 200 and the cam slot 202 are formed of multiple cam sections. In the exemplary embodiment shown, the cam unit 200 and cam slot 202 are formed from three individual sections, which include a mold open cam section 210, a mold dwell cam section 220 and a mold closed cam section 230.

The mold open cam section 210 has an entrance end 212 which is funnel-like in shape and of appreciable width at the entrance to insure the ready reception of the cam followers 156 as they progressively move clockwise relative to the cam unit 200 as viewed in FIG. 6. The cam followers 156 initially engage a lower wall 214 of the cam section 210. The configuration of the entrance end 212 and the lower wall 214 causes the cam followers 156 to move to the high point 216 of the cam section 210. Continued movement of the cam follower 156 causes each respective cam follower 156 to engage the declining portion 218. As the cam followers 156 are advanced through the declining portion 218, the movement of the cam followers 156 causes the mold halves 132, 134 to move from the closed position of FIG. 3 to the open position of FIG. 4.

Continued movement of the cam followers 156 causes the cam followers 156 to move from the mold open cam section 210 to the mold dwell cam section 220. In this section 210, the cam followers 156 are moved through the dwell portion 222 of the cam slot 202. During this period, the cam followers and the mold halves 132, 134 are maintained in the open position.

Once the cam followers 156 are moved through the mold dwell cam section 220, they enter the mold close cam section 230. In this section 230, the cam followers 156 engage the actuation portion 232 of the cam slot 202. As the cam followers 156 are advanced through the actuation portion 232, the movement of the cam followers 156 causes the mold halves 132, 134 to move from the open position of FIG. 4 to the closed position of FIG. 3. The continued advancement of the cam followers 156 through the mold close cam section 230 causes the cam followers 156 to move past the high point 236 prior to exiting the exit portion 234, thereby properly positioning the mold halves 132, 134 in the closed position and properly positioning the cam followers 156 for alignment with the entrance portion 212 after the wheel 24 and respective cam follower 156 have been rotated and returned to the entrance portion 212.

Figure 7:
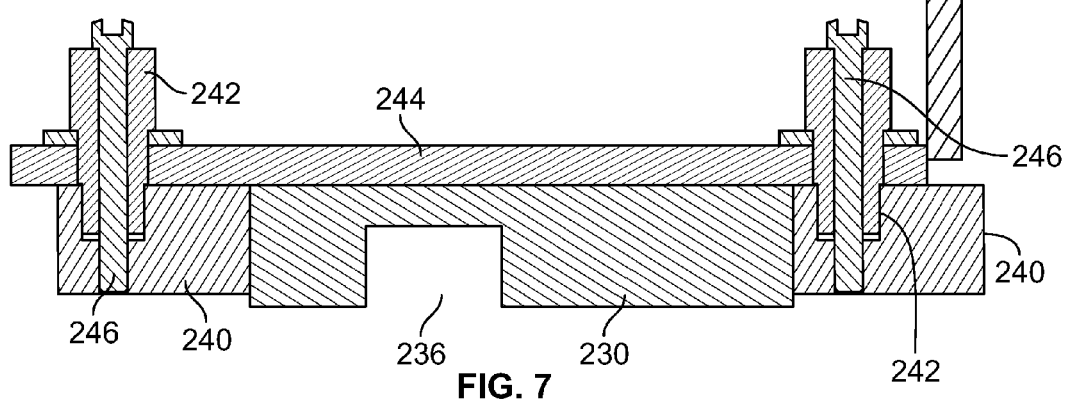
FIG. 7 is an enlarged cross-sectional view, taken along line 7-7 of FIG. 6, showing mounting assembly provided at the end of the cam unit.
Figure 8:
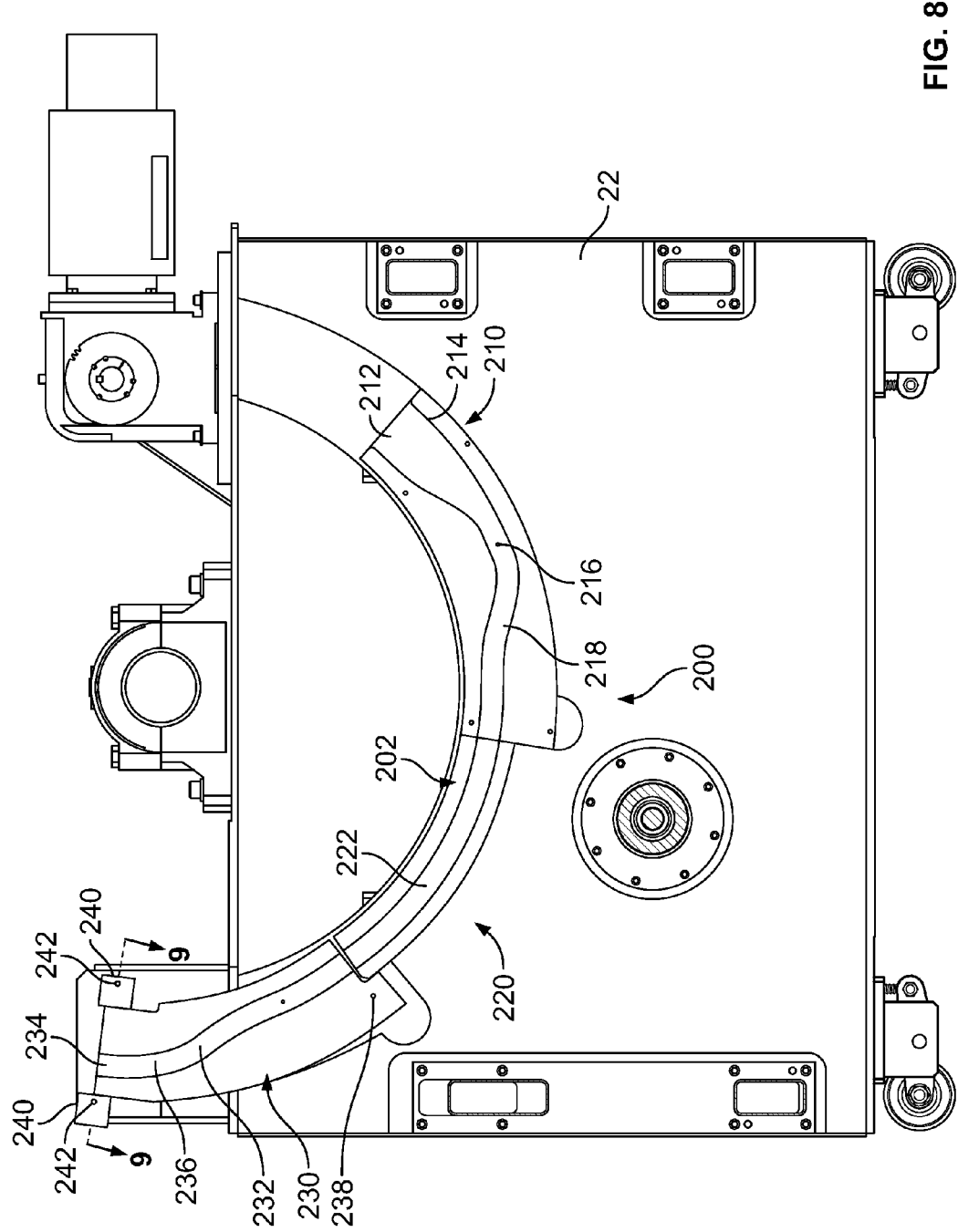
FIG. 8 is a vertical elevation of a cam unit carried by the base of the blow molding machine, the cam unit being shown in a second position.
Figure 9:
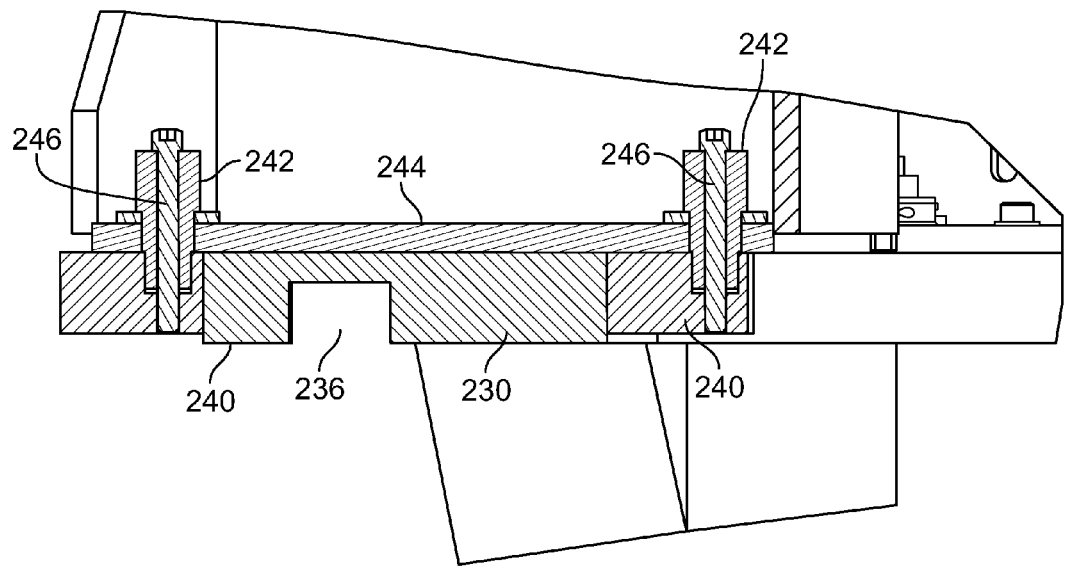
FIG. 9 is an enlarged cross-sectional view, taken along line 9-9 of FIG. 8, showing mounting assembly provided at the end of the cam unit.

The mold close cam section 230, as best shown in FIGS. 6 through 8, is pivotally mounted to a mounting plate 244. The mounting plate 244 may be an integral portion of the base 22 or may be a separate component which is mounted to the base 22 in any known manner. The mold close cam section 230 is mounted to the mounting plate 244 by a pivot pin 238 or similar mounting member or device. The pivot pin 238 maintains the mold close cam section 230 in parallel alignment with the mounting plate 244, while allowing the mold close cam section 230 to rotate about the pivot pin 238 within the plane. This allows the exit portion 234 to rotate about the pivot pin 238, thereby allowing the cam track at the exit portion 234 to move essentially perpendicular to the arc of rotation of the wheel 24.

Figure 10:
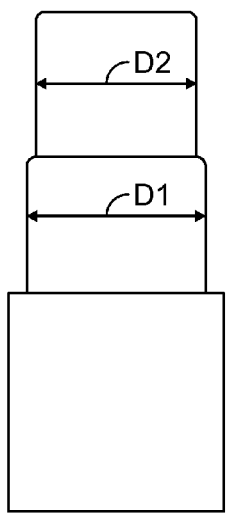
FIG. 10 is a perspective view of an eccentric pin of the mounting assembly.

Mounting blocks 240 are provided proximate the exit portion 234 of the mold close cam section 230. As shown in FIGS. 6 through 9, the mounting blocks 240 are positioned on either side of the mold close cam section 230. An eccentric stud 242 cooperates with each mounting block 240. As shown in FIG. 10, the eccentric stud 242 consists of two diameters offset from one another. The first diameter D1 communicates with a bore in mounting plate 244. The second diameter D2 communicates with a bore in mounting block 240. When the stud 242 is rotated, the block 240 moves in an elliptical path defined by the amount of offset of the two diameters, around the bore in mounting plate 244. The side of block 240 communicates with the edge of cam 230 pivoting cam 230 around pin 238. Screw 246 locks stud 242 and mounting block 240 in position once the adjustment is made.

In operation, each cam follower 156 engages the actuation portion 232 of the mold close cam section 230, causing the cam follower 156 to move to a closed position. By adjusting the end portion 234 and the high point 236 of the mold close cam section 230 to the optimum position for the particular molds being used in the wheel, the optimum closed position of the cam follower and the mold halves can be obtained. After closing of the mold to capture the parison, rotation of wheel 24 moves the cam followers 156 from the cam slot 202 and the closed mold halves away from the extrusion station to a blow station where the parisons are blown, and, after cooling of the blown parisons, to an ejection station where the cam followers 156 engage the declining portion 218 of the mold open cam section 210 where the mold is opened for ejection of blow-molded containers. During rotation to the ejection station, follower 156 is moved radially inwardly by the cam track so that arm end 146 is moved radially inwardly about fixed pin 142, drive 163 is retracted as shown in FIG. 4, and the platens 126, 128 and mold halves 132, 134 are opened by movement of the shift member 162 and mechanism 165. Platen 126 and mold half 132 are connected directly to shift member 162 and are opened in response to movement of the member. Platen 128 and mold half 134 are opened by movement of shift rod 168 toward side member 113, which corresponds to rotation of arm 172 and movement of rod 180 away from side member 113 and toward side member 111.

The use of an adjustable multiple-piece cam track provides advantages over the fixed cam track assemblies known in the art. As the machines upon which the cam tracks are used are relatively large, the fixed cam track assemblies are fabricated from a multiple sections which are assembled and machined as one unit from material having the appropriate strength and durability requirements. These fixed cam track assemblies range in size, but are can be 5 feet long and 1000 pounds in weight. As only a limited number of manufacturers can produce such a part, the cost and lead-time required to acquire the fixed cam track assembly can be significant. In addition, due to the size, the installation of the cam track assembly on the machine can be difficult and time consuming, as the fixed cam track assembly must be precisely positioned for optimum performance.

In contrast, the adjustable multiple-piece cam track described herein, of which cam slot 202 of cam unit 200 is but one example, is manufactured in sections to reduce the complexity and size of the fabrication process used. As the sections are manufactured independently, the size of each section is significantly less than the size of the overall track, thereby allowing for the manufacture or fabrication of the track in facilities which do not have the large-scale manufacturing capacity required by the prior art. In so doing, the cost and lead-time required to produce the cam track is reduced. As each of the sections of the adjustable multiple-piece cam track is smaller and lighter than the entire structure, the installation of the sections of the adjustable multiple-piece cam track is also made easier than in the prior art. In addition, as the cam unit is provided in sections, the sections can be machined and/or replaced separately.

As the adjustable multiple-piece cam track is made in sections, the sections may be made of different materials and have different characteristics according to the use of the particular section. For instance, the mold open cam section may be made of material having increased durability characteristics. This allows the declining portion of the mold cam section to maintain its shape and integrity as the declining portion interacts with the cam follower to move the cam follower and the mold halves from the closed position to the open position. As the declining portion is subject to significant forces, it is beneficial if the mold open cam section is manufactured from steel or material which is not subject to excessive wear. In contrast, the mold dwell cam section merely guides the cam follower from the mold open cam section to the mold closed cam section. As the cam follower does not exert significant forces on the dwell portion of the cam track in this section, the mold dwell cam section may be manufactured from material which is more cost-effective and which is lighter than the material used for the mold open cam section.

The use of the adjustable multiple-piece cam track also allows the cam sections to be movable relative to each other. In the exemplary embodiment shown, the mold close cam section is moveable relative to the mold open cam section and the mold dwell cam section. This allows for ease of adjustment of the cam track to insure that the cam followers and mold halves are properly positioned in the closed position when leaving the exit portion of the cam track. When the machine is initially assembled, tolerances provided in the parts make it difficult to install all of the components in such a manner that the components are precisely aligned. Typically, some adjustments of various components are needed to insure that the cam followers and the mold halves are properly closed as rotation occurs. As the mold close cam section is pivotable relative to the arc of rotation of the machine, the end portion of the mold close cam section can be easily adjusted to precisely position the end portion, thereby insuring that the cam followers will be moved to the optimum position when leaving the cam track. This also insures that the mold close cam section can be aligned to position the high point of the mold close cam section to match the high point of the mold open cam section. This prevents unwanted wear and insures that the cam followers will properly engage all portions of the cam track.

The adjustment of the mold close cam section is also beneficial during periods of operation of the machine. As the machine is operated, vibration and the like can cause components to become misaligned. As the mold close cam section is readily adjustable, the operator can compensate for minor misalignment by adjusting the mold close cam section. This allows the productivity of the machine to be increased, as the adjustment can be done quickly, without the need for significant downtime for the machine. This also allows less skilled operators to accomplish the adjustment, such as maintenance level personnel rather than factory technicians.

The adjustment of the mold close cam section is also beneficial as the molds of the machine are changed to allow different containers or objects to be molded. As the molds may have a slightly different optimal closed position, the mold close cam section can be adjusted to accommodate such changes.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A multiple-piece cam unit for use in a molding machine, the cam unit having a cam track which engages cam followers of mold assemblies of the molding machine to move the cam followers between a first position and a second position, the cam unit comprising:
   a first cam section, the first cam section having an entrance portion, the entrance portion dimensioned to receive the cam followers therein;
   an independent second cam section, the second cam section having an exit portion, the exit portion positioned to release the cam followers therefrom, the second cam section has a mounting member, the mounting member allowing the exit portion to rotate about the mounting member, the second cam section being adjustable relative to the first cam section to allow the exit portion of the second cam section to be moved relative to the entrance portion of the first cam section, allowing the cam track at the exit portion to move essentially perpendicular to a rotational movement of the mold assemblies;
   whereby the exit portion can be adjusted to insure that the cam followers exiting the exit portion of the second cam section are properly aligned to enter the entrance portion of the first cam section.

2. The cam unit as recited in claim 1, wherein mounting blocks are provided proximate the exit portion of the second cam section, a respective mounting block being positioned on either side of the second cam section, the mounting blocks cooperating with the second cam section to maintain the second cam position between the mounting blocks.

3. The cam unit as recited in claim 2, wherein an eccentric stud cooperates with each respective mounting block, whereby as the eccentric stud is rotated, the mounting block moves in an elliptical path causing the mounting block to move laterally with respect to the rotational movement of the mold assemblies as the eccentric stud is turned, causing the cam track at the exit portion of the second cam section to be adjusted relative to the rotational movement of the mold assemblies.

4. The cam unit as recited in claim 3, wherein the eccentric stud has two diameters offset from one another, the first diameter communicates with a bore in a mounting plate and the second diameter communicates with a bore in the mounting block, whereby when the eccentric stud is rotated, the block moves in an elliptical path defined by the amount of offset of the two diameters, around the bore in mounting plate.

5. The cam unit as recited in claim 1, wherein the first cam section has a declining portion, the declining portion cooperating with the cam followers to move the cam followers from the first position to the second position, the second cam section having an actuation portion, the actuation portion cooperating with the cam followers to move the cam followers from the second position to the first position.

6. An adjustable multiple-piece cam unit for use in a molding machine, the cam unit having a cam track which engages cam followers of mold assemblies of the molding machine, the cam unit comprising:

an individual first cam section, the first cam section having an entrance portion and a declining portion, the entrance portion dimensioned to receive the cam followers therein, the declining portion cooperating with the cam followers to move the cam followers from a first position, in which mold halves of the mold assemblies are maintained in a closed position, to a second position, in which the mold halves of the mold assemblies are maintained in an open position;

an individual second cam section, the second cam section having an exit portion and an actuation portion, the exit portion positioned to release the cam followers therefrom, the actuation portion cooperating with the cam followers to move the cam followers from the second position to the first position, the second cam section being adjustable relative to the first cam section to allow the exit portion of the second cam section to be moved relative to the entrance portion of the first cam section;

whereby the exit portion can be adjusted to insure that the cam followers exiting the exit portion of the second cam section are properly aligned to enter the entrance portion of the first cam section.

7. The cam unit as recited in claim 6, wherein a third cam section is provided between the first cam section and the second cam section, the third cam section having a dwell portion which maintains the cam followers in the second position as the cam followers are moved therethrough.

8. The cam unit as recited in claim 6, wherein the second cam section has a mounting member positioned at a pivot point, the pivot point provided proximate an end adjacent to the third cam section, the mounting member allowing the exit portion to rotate about the mounting member, thereby allowing the cam track at the exit portion to move essentially perpendicular to a rotational movement of a wheel of the molding machine upon which the mold assemblies are mounted.

9. The cam unit as recited in claim 8, wherein mounting blocks are provided proximate the exit portion of the second cam section, a respective mounting block being positioned on either side of the second cam section, the mounting blocks cooperating with the second cam section to maintain the second cam position between the mounting blocks.

10. The cam unit as recited in claim 9, wherein an eccentric stud cooperates with each respective mounting block, whereby as the eccentric stud is rotated, the mounting block moves in an elliptical path causing the mounting block to move laterally with respect to the rotational movement of the wheel of the molding machine as the eccentric stud is turned, causing the cam track at the exit portion of the second cam section to be adjusted relative to the rotational movement of the wheel of the molding machine.

11. The cam unit as recited in claim 10, wherein the eccentric stud has two diameters offset from one another, the first diameter communicates with a bore in a mounting plate and the second diameter communicates with a bore in the mounting block, whereby when the eccentric stud is rotated, the block moves in an elliptical path defined by the amount of offset of the two diameters, around the bore in mounting plate.

12. A rotary molding machine comprising;

a pair of turntables rotatably mounted on a shaft;

a plurality of mold clamp assemblies mounted on and spaced around the turntable, the mold clamp assemblies having cam followers which are mechanically connected to mold halves of the mold clamp assemblies, the cam followers being moveable between a first position, in which the mold halves of the mold assemblies are maintained in a closed position, and a second position, in which the mold halves of the mold assemblies are maintained in an open position;

a multiple-piece cam unit mounted to the molding machine, the cam unit having a cam track which engages the cam followers, the cam unit comprising:

a first cam section, the first cam section having an entrance portion, the entrance portion dimensioned to receive the cam followers therein;

a second cam section, the second cam section having an exit portion, the exit portion positioned to release the cam followers therefrom, the second cam section being pivotally mounted relative to the molding machine, the second cam section being independently adjustable relative to the first cam section to allow the exit portion of the second cam section to be moved relative to the entrance portion of the first cam section;

whereby the exit portion of the second cam section can be adjusted to insure that the cam followers exiting the exit portion of the second cam section are properly aligned to enter the entrance portion of the first cam section as the turntables are rotated.

13. The rotary molding machine as recited in claim 12, wherein the first cam section has a declining portion, the declining portion cooperating with the cam followers to move the cam followers from the first position to the second position.

14. The rotary molding machine as recited in claim 12, wherein the second cam section has an actuation portion, the actuation portion cooperating with the cam followers to move the cam followers from the second position to the first position.

15. The rotary molding machine as recited in claim 12, wherein a third cam section is provided between the first cam section and the second cam section, the third cam section having a dwell portion which maintains the cam followers in a respective position as the cam followers are moved therethrough.

16. The rotary molding machine as recited in claim 12, wherein the second cam section has a mounting member positioned at the pivot point, the pivot point being positioned proximate an end thereof, the mounting member allowing the exit portion to rotate about the mounting member, thereby allowing the cam track at the exit portion to move essentially perpendicular to a rotational movement of the turntables.

17. The rotary molding machine as recited in claim 12, wherein mounting blocks are provided proximate the exit portion of the second cam section, a respective mounting block being positioned on either side of the second cam section, the mounting blocks cooperating with the second cam section to maintain the second cam position between the mounting blocks.

18. The rotary molding machine as recited in claim 17, wherein an eccentric stud cooperates with each respective mounting block, whereby as the eccentric stud is rotated, the mounting block moves in an elliptical path causing the mounting block to move laterally with respect to the rotational movement of the turntables as the eccentric stud is turned, causing the cam track at the exit portion of the second cam section to be adjusted relative to the rotational movement of the turntables.

19. The rotary molding machine as recited in claim 18, wherein the eccentric stud has two diameters offset from one another, the first diameter communicates with a bore in a mounting plate and the second diameter communicates with a bore in the mounting block, whereby when the eccentric stud is rotated, the block moves in an elliptical path defined by the amount of offset of the two diameters, around the bore in mounting plate.

* * * * *